(12) United States Patent
Tucker

(10) Patent No.: US 6,449,010 B1
(45) Date of Patent: Sep. 10, 2002

(54) SYSTEM AND METHOD FOR ENHANCING DISPLAY OF A SPORTING EVENT

(75) Inventor: George Tucker, Berkeley, CA (US)

(73) Assignee: Forsum Digital Effects, Berkeley, CA (US)

( * ) Notice: Subject to any disclaimer, the term of this patent is extended or adjusted under 35 U.S.C. 154(b) by 0 days.

(21) Appl. No.: 09/375,478

(22) Filed: Aug. 16, 1999

Related U.S. Application Data

(63) Continuation-in-part of application No. 08/770,294, filed on Dec. 20, 1996, now Pat. No. 5,953,056.

(51) Int. Cl.$^7$ ................................................. H04N 7/18
(52) U.S. Cl. ..................................... 348/157; 348/579
(58) Field of Search ..................... 342/357.04, 357.06, 342/386; 348/121, 157, 578, 579; 473/131, 156, 252, 407, 409; H04N 7/18

(56) References Cited

U.S. PATENT DOCUMENTS

| | | | |
|---|---|---|---|
| 3,612,761 A | | 10/1971 | Wolff |
| 4,158,853 A | | 6/1979 | Sullivan et al. |
| 4,160,942 A | | 7/1979 | Lynch et al. |
| 4,393,394 A | | 7/1983 | McCoy |
| 4,673,183 A | | 6/1987 | Trahan |
| 5,111,410 A | | 5/1992 | Nakayama et al. |
| 5,177,489 A | * | 1/1993 | Hatch ..................... 342/357.04 |
| 5,342,051 A | | 8/1994 | Rankin et al. |
| 5,398,936 A | * | 3/1995 | Kluttz et al. ................. 473/156 |
| 5,413,345 A | | 5/1995 | Nauck |
| 5,489,099 A | | 2/1996 | Rankin et al. |
| 5,513,854 A | | 5/1996 | Daver |
| 5,572,218 A | * | 11/1996 | Cohen et al. .......... 342/357.06 |
| 5,583,513 A | * | 12/1996 | Cohen .................... 342/357.06 |
| 5,938,545 A | * | 8/1999 | Cooper et al. .............. 473/407 |

OTHER PUBLICATIONS

Yamanouchi, Y., et al., "Real–Time Locus Indication System for a Flying Golf Ball", *SMPTE Journal*, pp. 606–609, Sep. 1995.

* cited by examiner

*Primary Examiner*—Richard Lee
(74) *Attorney, Agent, or Firm*—Dorsey & Whitney LLP

(57) ABSTRACT

A system and method for enhancing display of a sporting event. The path of a ball in a playing field of the sporting event is tracked while the ball is moving. In response, successive overlay video image frames are generated that represent successive overlay video images of the path of the ball within the large field of view but without the playing field in the background. In one embodiment, the successive overlay video image frames are combined with a single background video image frame so as to generate successive overlaid video image frames. The overlaid video image frames represent successive overlaid video images of the path of the ball in the playing field within the large field of view. In another embodiment, the successive overlay video image frames are combined with successive background video image frames so as to generate the successive overlaid video image frames.

22 Claims, 9 Drawing Sheets

SYSTEM AND METHOD FOR ENHANCING DISPLAY OF A SPORTING EVENT

CROSS REFERENCE TO RELATED PATENT APPLICATIONS

This patent application is a continuation-in-part of U.S. patent application Ser. No. 08/770,294, filed on Dec. 20, 1996, now U.S. Pat. No. 5,953,056.

FIELD OF THE INVENTION

The present invention relates generally to systems and methods for enhancing display of a sporting event. In particular, it pertains to a system and method for enhancing display of a sporting event by tracking the path of a ball in a playing field of the sporting event while the ball is moving and generating successive overlaid video data frames that represent corresponding successive overlaid video images of the path of the ball within a large field of view of the playing field.

BACKGROUND OF THE INVENTION

In a typical televised broadcast of a sporting event, video cameras are used for displaying the sporting event to viewers. These video cameras provide numerous views and perspectives of the sporting event that enhance display of the sporting event for the viewers. However, for sporting events with a ball that moves rapidly in the sporting event's playing field, such as golf, baseball, football, tennis, soccer, etc., physical constraints prevent these video cameras from accurately tracking the ball within a large field of view of the playing field for continuous near-real time display of the moving ball within the large field of view. Such physical constraints include manual tracking of the ball with the video cameras, the size of the ball, the velocity and acceleration of the ball in the playing field, the weather conditions, the placement of the video cameras, obstructions of view, etc.

Because of the physical constraints just mentioned, the video cameras used in a typical televised broadcast of a sporting event are only able to track and display the ball within a small field of view. This unfortunately provides the viewer with little insight into the overall shape and distance of the path of the ball while it moves in the playing field. In golf, such a small field of view display of a golf ball does not portray the inherent difficulty of a golf shot where, for example, the golfer needs to negotiate a water hazard or a bunker or needs to dramatically bend the golf shot. Similarly, in baseball, such a small field of view display of a baseball does not portray the distance that the baseball was hit or where it was hit.

Some attempts have been made at automatically tracking the flight of a ball in the playing field of a sporting event. For example, U.S. Pat. No. 5,342,051, entitled "APPARATUS AND METHOD FOR TRACKING THE FLIGHT OF A GOLF BALL", issued on Aug. 30, 1994, which is hereby incorporated by reference, describes such an approach. The system and method described in this patent uses a video camera located at the side of a golf hole. When a golfer makes a golf shot, the path of the ball is automatically tracked by the video camera. In doing so, the video camera generates successive video data frames that represent successive video images of the ball within a small field of view. A video frame processor generates from the successive video data frames successive determined position data sets that represent successive determined positions of the ball within the successive video images. From the successive determined position data sets, a flight path predictor generates successive predicted position data sets that represent successive predicted positions of the ball within the video images so as to predict the path of the ball. A tracking motion controller generates motion control signals from the successive predicted position data sets. In response to the motion control signals, the video camera moves and generates the successive video image frames so that the ball is tracked by the video camera while the ball moves. As this is occurring, the tracking motion controller generates successive motion data sets representing the successive motions of the video camera. The successive motion data sets are recorded and then post processed after the golf shot was made to generate a displayable data set representing information on the golf shot.

However, the system and method described in U.S. Pat. No. 5,342,051 is unable to provide tracking of the golf ball within an overhead large field of view of the golf hole for continuous near-real time display of the path of the golf ball within the large field of view. Specifically, because the video camera is located at the side of the golf hole, the displayable data set, when displayed, does not provide an overhead view of the shape and distance of the golf shot within the large field of view. Moreover, because the system and method use post processing, near-real time display of the path of the golf ball is also not provided.

SUMMARY OF THE INVENTION

In summary, the present invention is a system and method for enhancing display of a sporting event. This is done by tracking the path of a ball in a playing field of the sporting event while the ball is moving and generating successive overlaid video image frames that represent successive overlaid video images of the path of the ball in the playing field within a large field of view.

In the system and method, a tracking video camera is positioned over the playing field. The tracking video camera generates successive tracking video image frames that represent successive tracking video images of successive small field of views containing the ball. From the successive tracking video image frames, successive determined location data sets are generated that represent successive determined locations of the ball within the successive tracking video images. From the successive determined location data sets, successive predicted position data sets are generated that represent successive predicted positions of the ball with respect to the tracking video camera so as to predict the path of the ball. Orientation control signals are generated from the successive predicted position data sets. The tracking video camera adjusts its orientation in response to the orientation control signals and generates the successive tracking video image frames so as to track the ball while the ball is moving.

From the successive position data sets, successive overlay video image frames are generated. The successive overlay video image frames represent successive overlay video images of the path of the ball within the large field of view but without the playing field in the background.

In one embodiment, a single background video image frame is generated earlier with a background video camera. The background video image frame is recorded and represents a background video image of the playing field within the large field of view. The successive overlay video image frames are combined with the background video image frame so as to generate the successive overlaid video image frames. Here, the successive overlaid video images comprise the successive overlay video images overlaid on the background video image.

In another embodiment, successive background video image frames are generated with the background video camera while the ball is moving. The successive overlay video image frames are combined with the successive background video image frames so as to generate the successive overlaid video image frames. In this embodiment, the successive overlaid video images comprise the successive overlay video images overlaid on the successive background video images.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
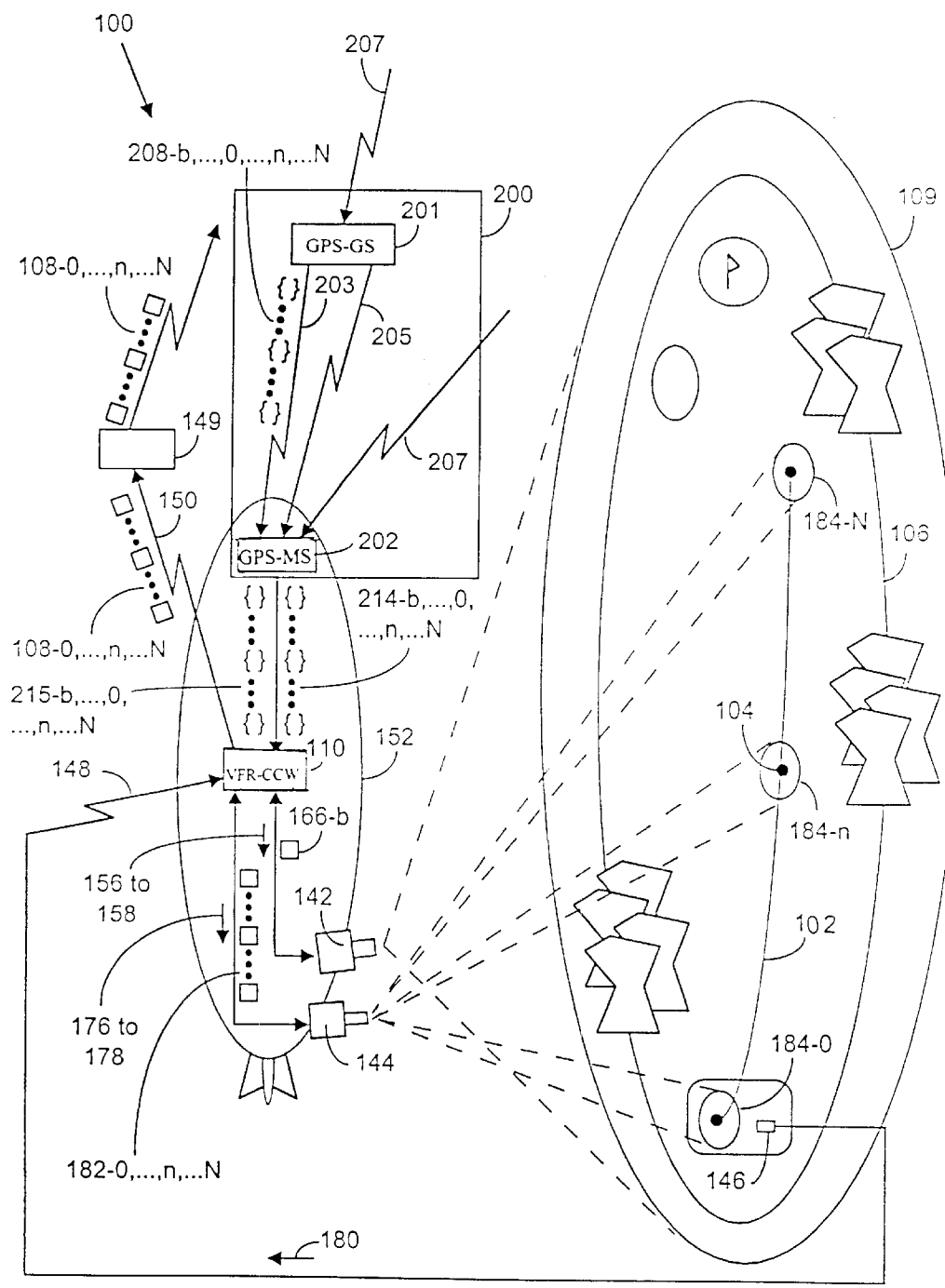
FIG. 1 is a block diagram of a sporting event display enhancement system in accordance with the present invention.
Figure 5A:
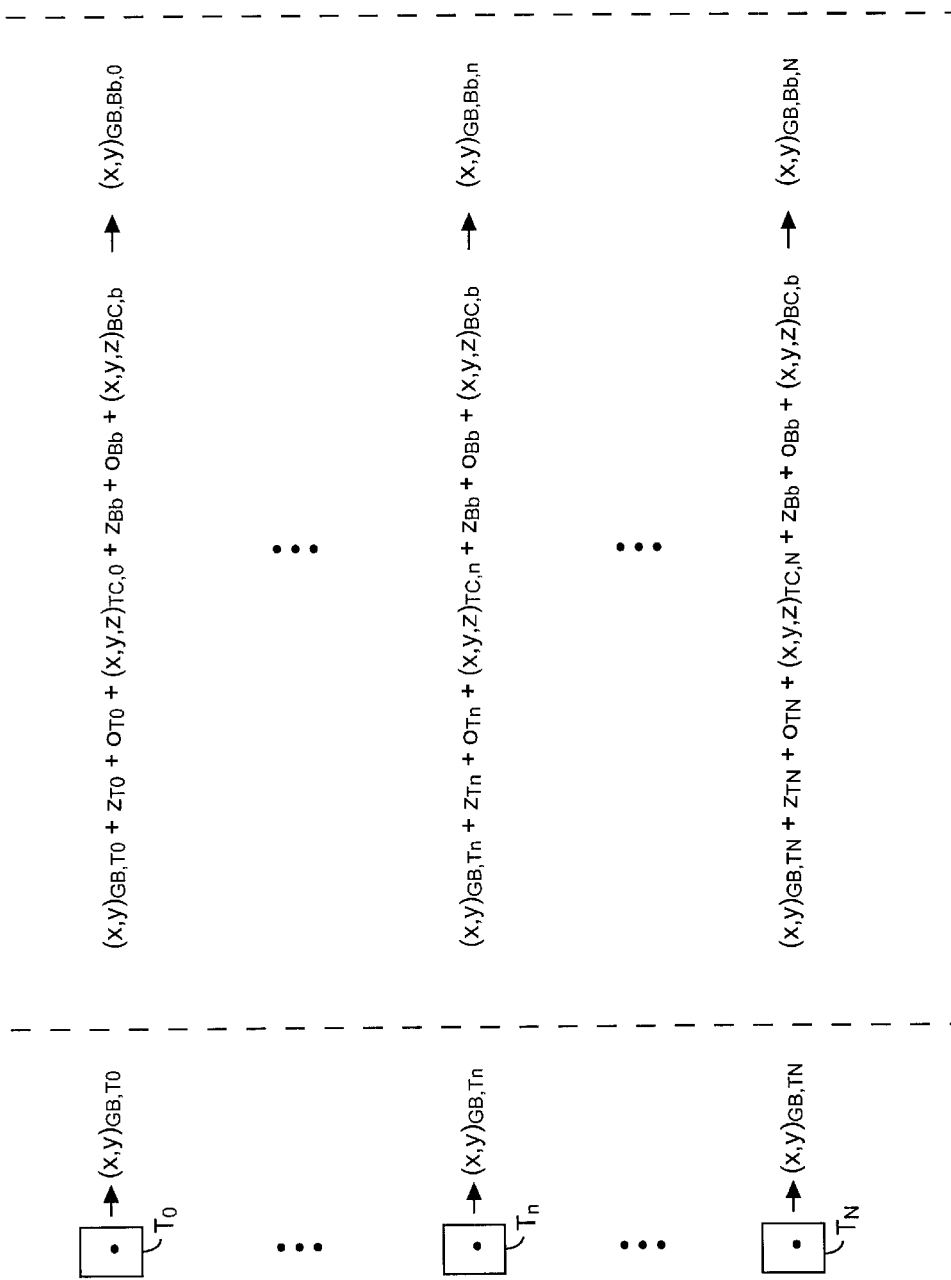
FIG. 5 shows how successive overlaid video images are formed by the sporting event display enhancement system for the operation in FIG. 4.
Figure 5B:
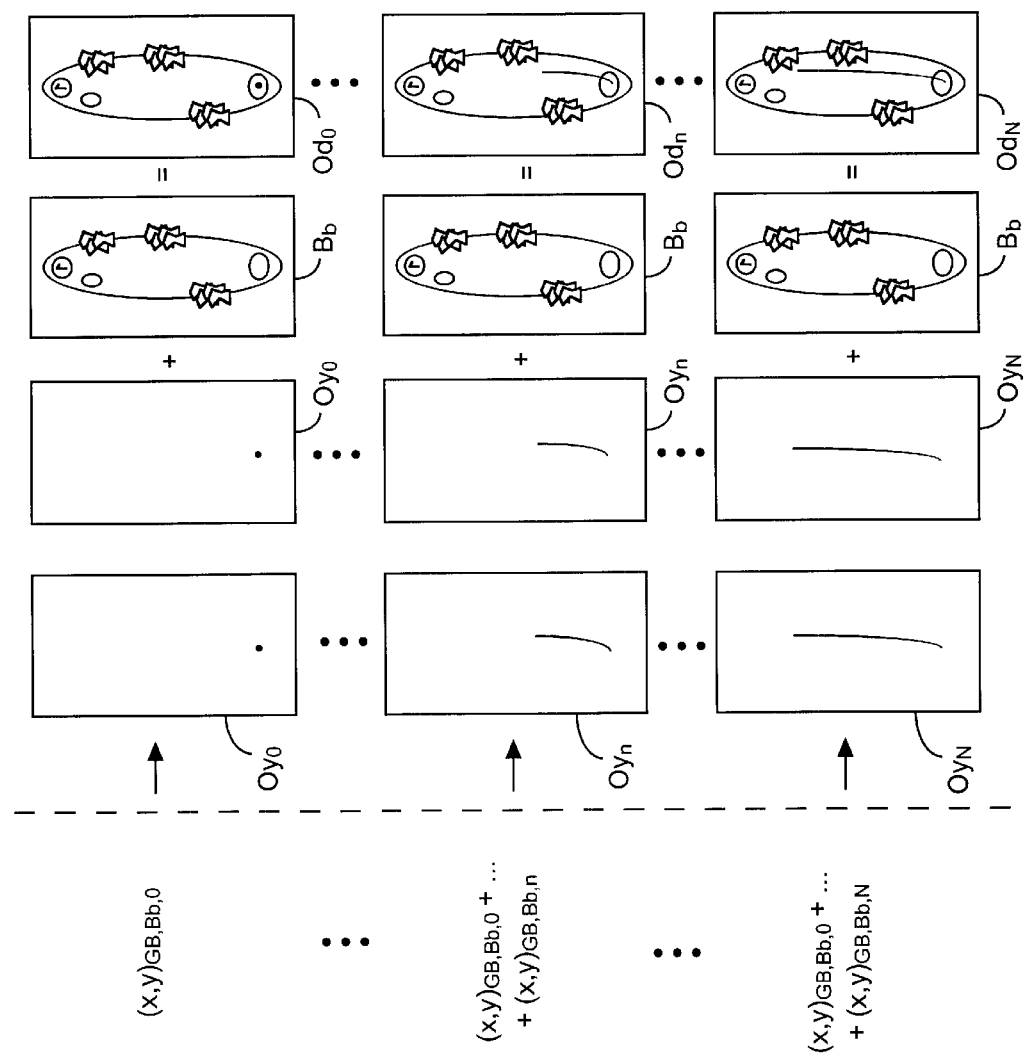
Figure 7A:
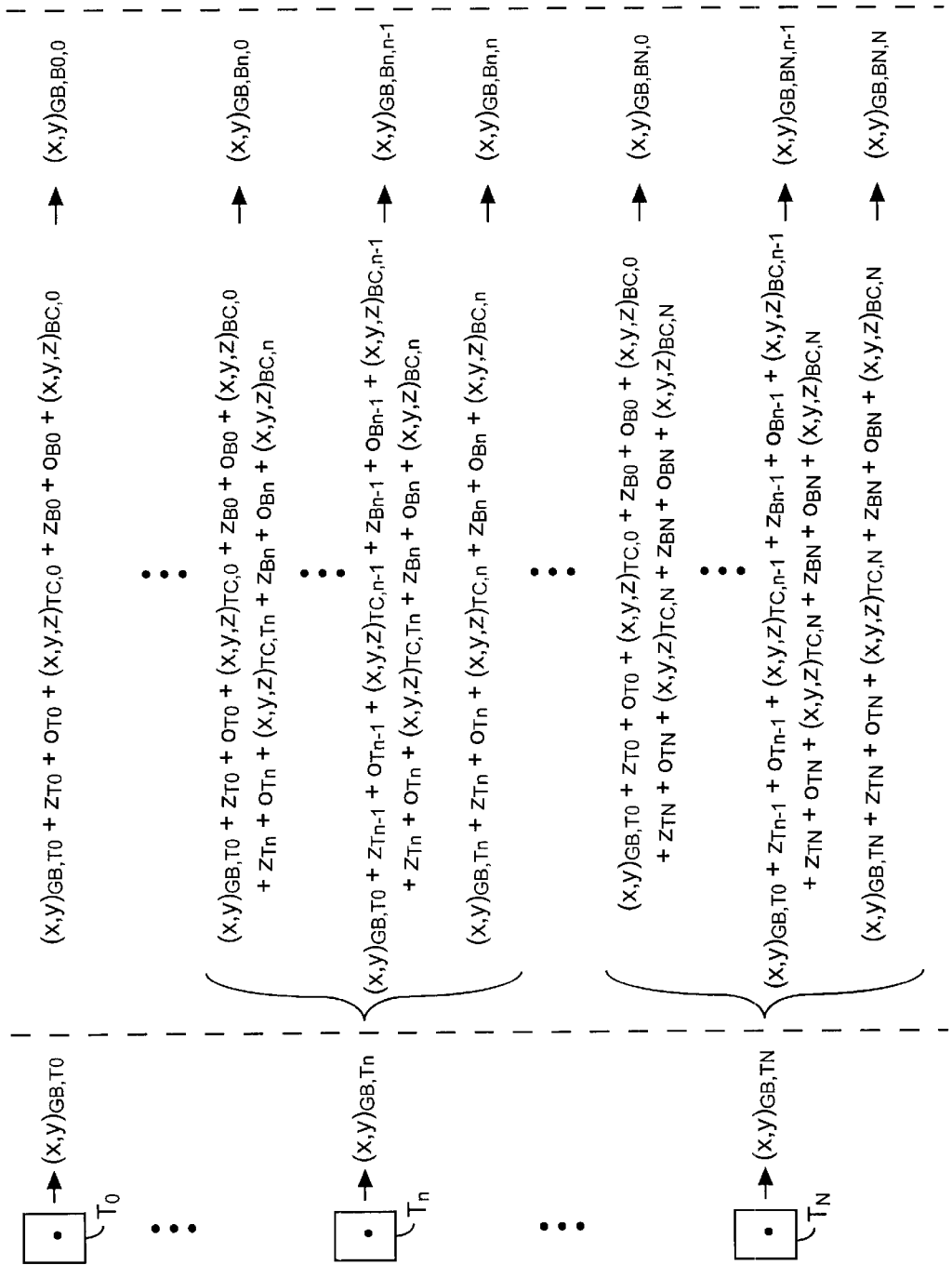
FIG. 7 shows how successive overlaid video images are formed by the sporting event display enhancement system for the operation in FIG. 6.
Figure 7B:
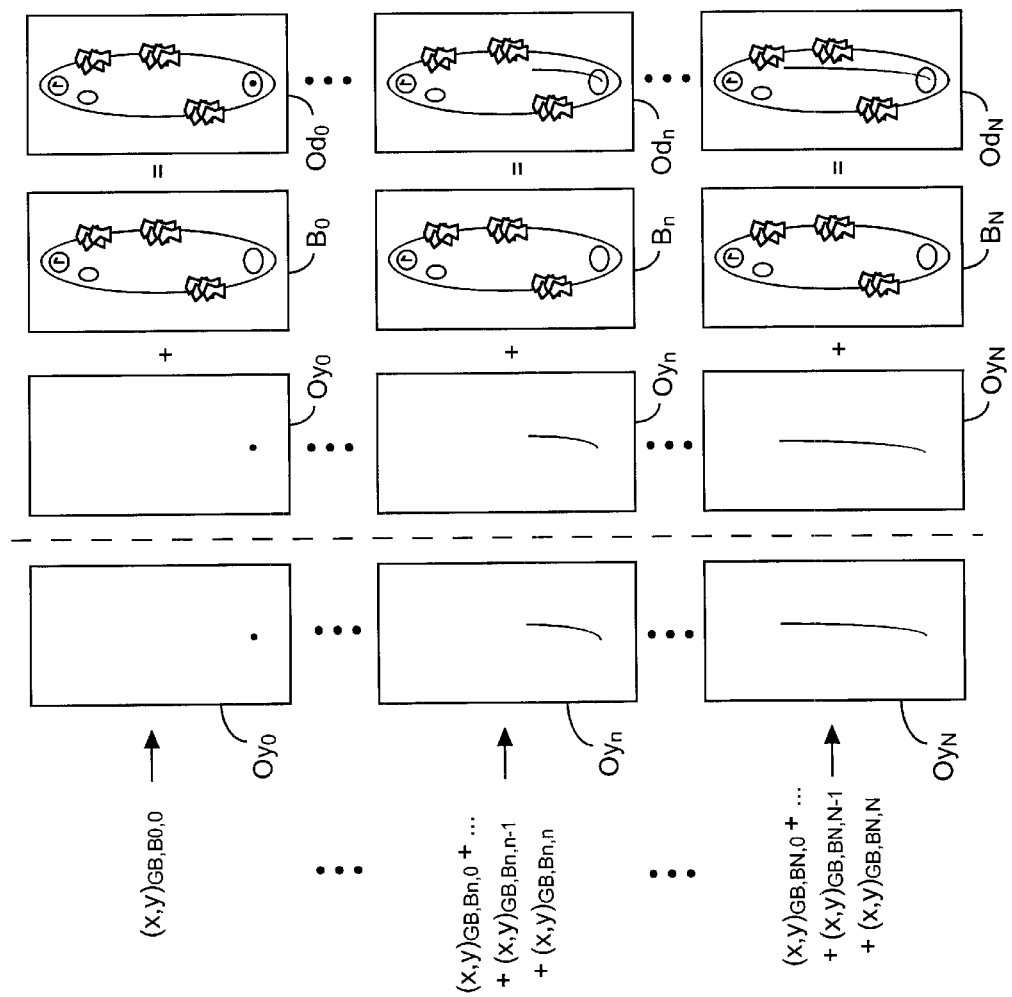

Referring to FIG. 1, there is shown an exemplary embodiment of a sporting event display enhancement system 100 in accordance with the present invention. The system is used to enhance display of a sporting event by tracking the path 102 of a ball 104 in a playing field 106 of the sporting event while the ball is moving and in response generating successive overlaid video image frames 108-0, ..., n, ..., N. The successive overlaid video image frames are generated in near-real time (i.e., approximately less than 1/30 of a second delay) and may be broadcast for display in near-real time. Referring also to FIGS. 5 and 7, the successive overlaid video image frames represent corresponding successive overlaid video images $Od_0, \ldots, Od_n, \ldots, Od_N$ of the path of the ball at corresponding successive processing epochs $0, \ldots, n, \ldots, N$. These images are from overhead within an overhead large (i.e., wide) field of view 109 containing the playing field.

Referring back to FIG. 1, for illustration purposes, the display enhancement system 100 will be hereinafter described in the context of the sporting event being a golf game, the ball 104 being a golf ball, and the playing field 106 being a golf hole. However, those skilled in the art will recognize that the system disclosed herein is applicable for use in other sporting events, such as baseball, football, tennis, soccer, etc., in which a ball moves rapidly within a playing field.

Figure 2:
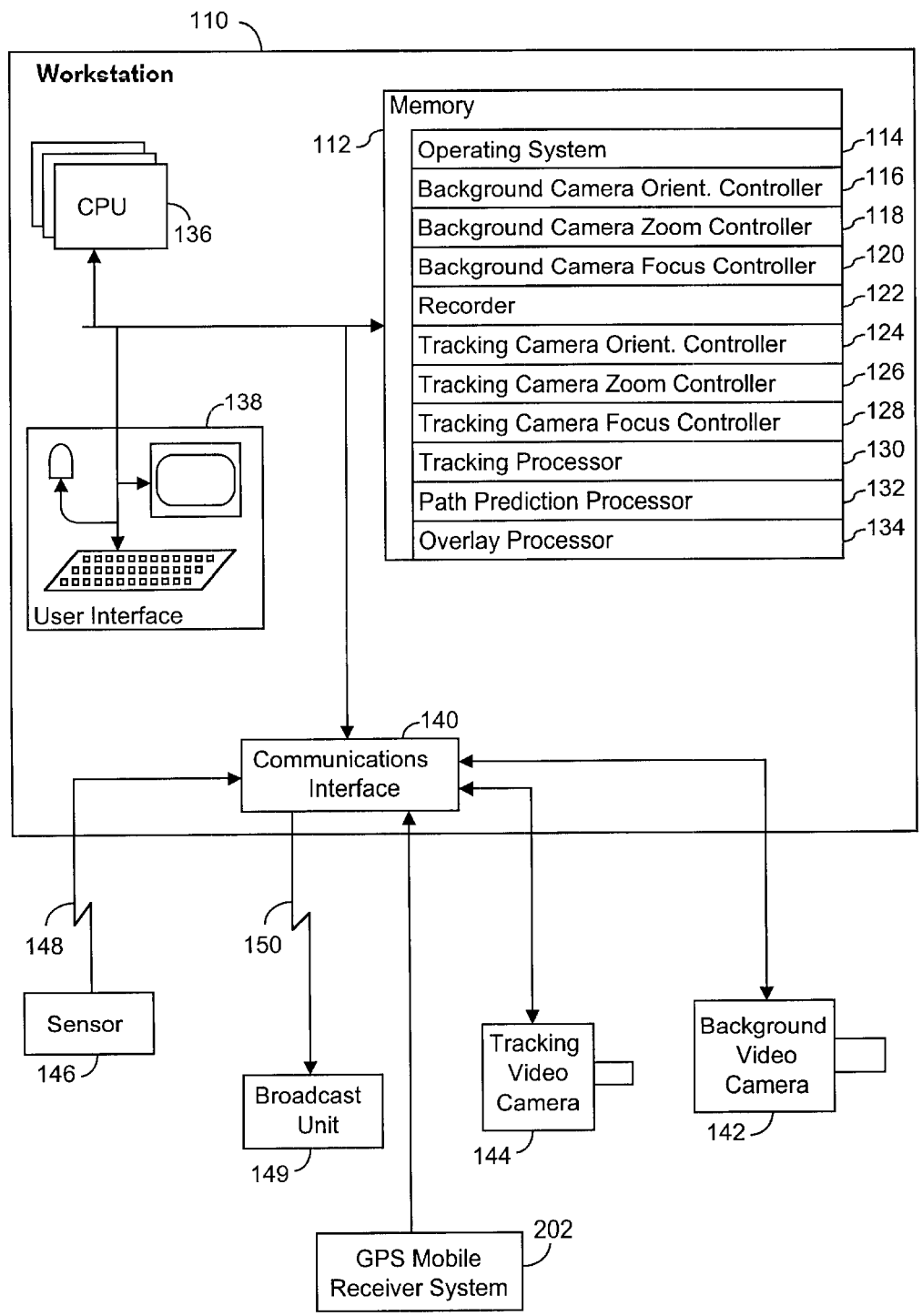
FIG. 2 is a block diagram showing the hardware and software components of the sporting event display enhancement system.

The display enhancement system 100 includes a video frame processing and camera control workstation (VFR-CCW) 110 located on a blimp 152. Turning to FIG. 2, the workstation includes a memory 112 that stores a number of programs 114 to 134. These programs include an operating system 114 and processing and control programs 116 to 134. All of these programs are run on the CPU 136 of the workstation. The operating system controls and coordinates running of the processing and control programs in response to commands issued by a user with the user interface 138 of the workstation. The CPU may comprise multiple microprocessors that share the memory and run some or all of the workstation's programs simultaneously. Or, the CPU may comprise a single microprocessor in which case running of the workstation's programs is timed shared.

As shown in FIG. 1, the display enhancement system 100 also includes background and tracking video cameras 142 and 144, a sensor 146, a first communications link 148, and a broadcast unit (BU) 149, a second communications link 150, and a precise GPS positioning system 200. Referring to FIG. 2, the workstation 110 includes a communications interface 140 that enables certain of the processing and control programs 114 to 134 to communicate with the background and tracking video cameras, with the sensor via the first communications link, and with the broadcast unit via the second communications link.

Referring again to FIG. 1, the background and tracking video cameras 142 and 144 are moveably mounted to the blimp 152. During a golf shot, the blimp is positioned over the golf hole 106 so that the background and tracking video cameras are themselves positioned over the golf hole. The background and tracking video cameras need not be positioned directly over the golf hole and therefore can be positioned over the golf hole on either side of, in front of, or behind the golf hole.

The GPS positioning system 200 may be one of the types described in U.S. Pat. Nos. 5,177,489, 5,572,218, and 5,583,513, which are all hereby incorporated by reference, to provide centimeter level accuracy. Thus, it includes a GPS ground system (GPS-GS) 201, a GPS mobile system (GPS-MS) 202 mounted on the blimp 152, and, for either of the system types described in U.S. Pat. Nos. 5,177,489 and 5,572,218, a communications link 203 between the GPS ground and mobile systems.

Figure 3:
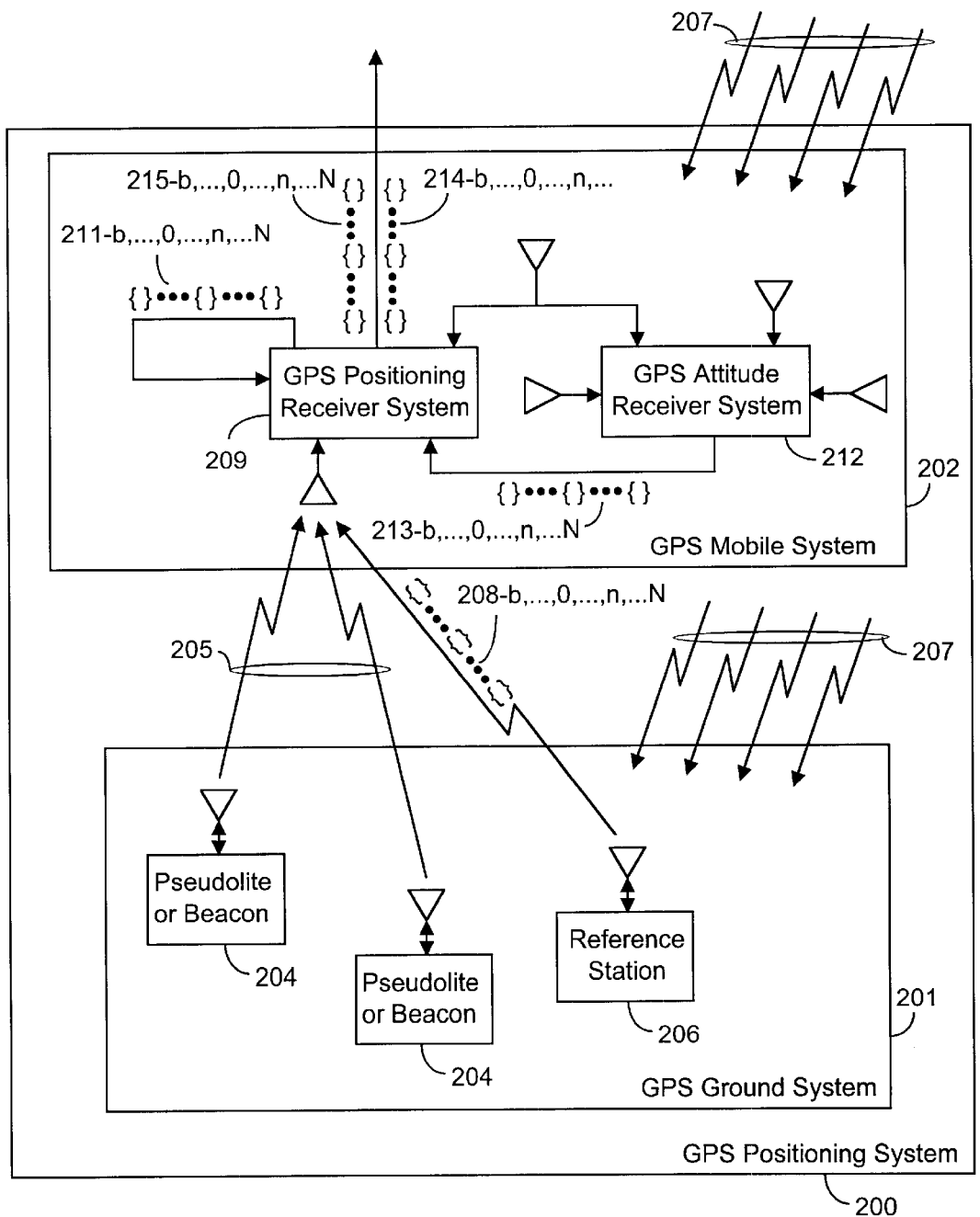
FIG. 3 is a block diagram of the components of the precise positioning system of the sporting event display enhancement system.

Turning to FIG. 3, if the system type described in U.S. Pat. No. 5,177,489 or 5,572,218 is used, the GPS ground system 201 comprises one or more pseudolites 204 and a reference station 206. The pseudolites generate and transmit pseudolite signals 205. The reference station receives GPS signals 207 from GPS satellites (not shown) and in response generates successive reference data sets 208-b, ..., 0, ..., n, ..., N at the corresponding successive processing epochs b, ..., 0, ..., n, ..., N. The successive reference data sets represent reference data and are transmitted to the GPS mobile system via the communications link 203.

If the system type is of the type described in U.S. Pat. No. 5,583,513, then the GPS ground system 201 comprises one or more beacons 204 that generate and transmit beacon signals 205. The beacons, in effect, act as repeaters of the GPS signals 207 in providing the beacon signals. As described in U.S. Pat. No. 5,583,513, reference data is directly extracted by the GPS mobile system 202 from the beacon signals.

The GPS mobile system 202 includes a GPS positioning receiver system 209 to receive the GPS and pseudolite or beacon signals 205 and 207 and, for the system type of U.S.

Pat. No. 5,177,489 or 5,572,218, the successive reference data sets $208\text{-}b, \ldots, 0, \ldots, n, \ldots, N$. The GPS positioning receiver system makes successive carrier phase measurements of the received GPS and pseudolite or beacon signals. From the successive carrier phase measurements and, if the system type of U.S. Pat. No. 5,177,489 or 5,572,218 is used, the successive reference data sets, the GPS positioning receiver system generates successive precise position data sets $211\text{-}b, \ldots, 0, \ldots, n, \ldots, N$ representing corresponding successive precise positions for a reference point on the blimp 152 at the corresponding successive processing epochs $b, \ldots, 0, \ldots, n, \ldots, N$. This reference point is preferably the intersection of the three perpendicular axis about which the blimp 152 rotates or pivots.

The GPS mobile system 202 also includes a GPS attitude receiver system 212 to receive the GPS signals 207 at various points around the reference point of the blimp 152. The GPS attitude receiver system is of the type described in U.S. Pat. No. 5,548,293, which is also hereby incorporated by reference. The GPS attitude receiver system makes successive carrier phase measurements of the received GPS signals. From the successive carrier phase measurements, the GPS attitude receiver generates successive precise attitude data sets $213\text{-}b, \ldots, 0, \ldots, n, \ldots, N$ representing corresponding successive attitudes (i.e., yaw, pitch, and roll) of the blimp 152 about the reference point at the corresponding successive processing epochs $b, \ldots, 0, \ldots, n, \ldots, N$. As described in U.S. Pat. Nos. 5,572,218 and 5,583,513, an INU (inertial navigation unit) could be used instead to provide the successive precise attitude data sets.

From the successive position and attitude data sets $211\text{-}b, \ldots, 0, \ldots, n, \ldots, N$ and $213\text{-}b, \ldots, 0, \ldots, n, \ldots, N$, the GPS positioning receiver system 209 generates successive tracking camera position data sets $214\text{-}b, \ldots, 0, \ldots, n, \ldots, N$ and successive background camera position data sets $215\text{-}b, \ldots, 0, \ldots, n, \ldots, N$ respectively for the tracking and background cameras. The successive tracking and background camera position data sets respectively represent corresponding successive precise positions $(x,y,z)_{BC,b}, \ldots, (x,y,z)_{BC,0}, \ldots, (x,y,z)_{BC,n}, \ldots, (x,y,z)_{BC,N}$ and $(x,y,z)_{TC,b}, \ldots, (x,y,z)_{TC,0}, \ldots, (x,y,z)_{TC,n}, \ldots, (x,y,z)_{TC,N}$ for the tracking and background video cameras 142 and 144 with respect to the golf hole 106.

Figure 4:
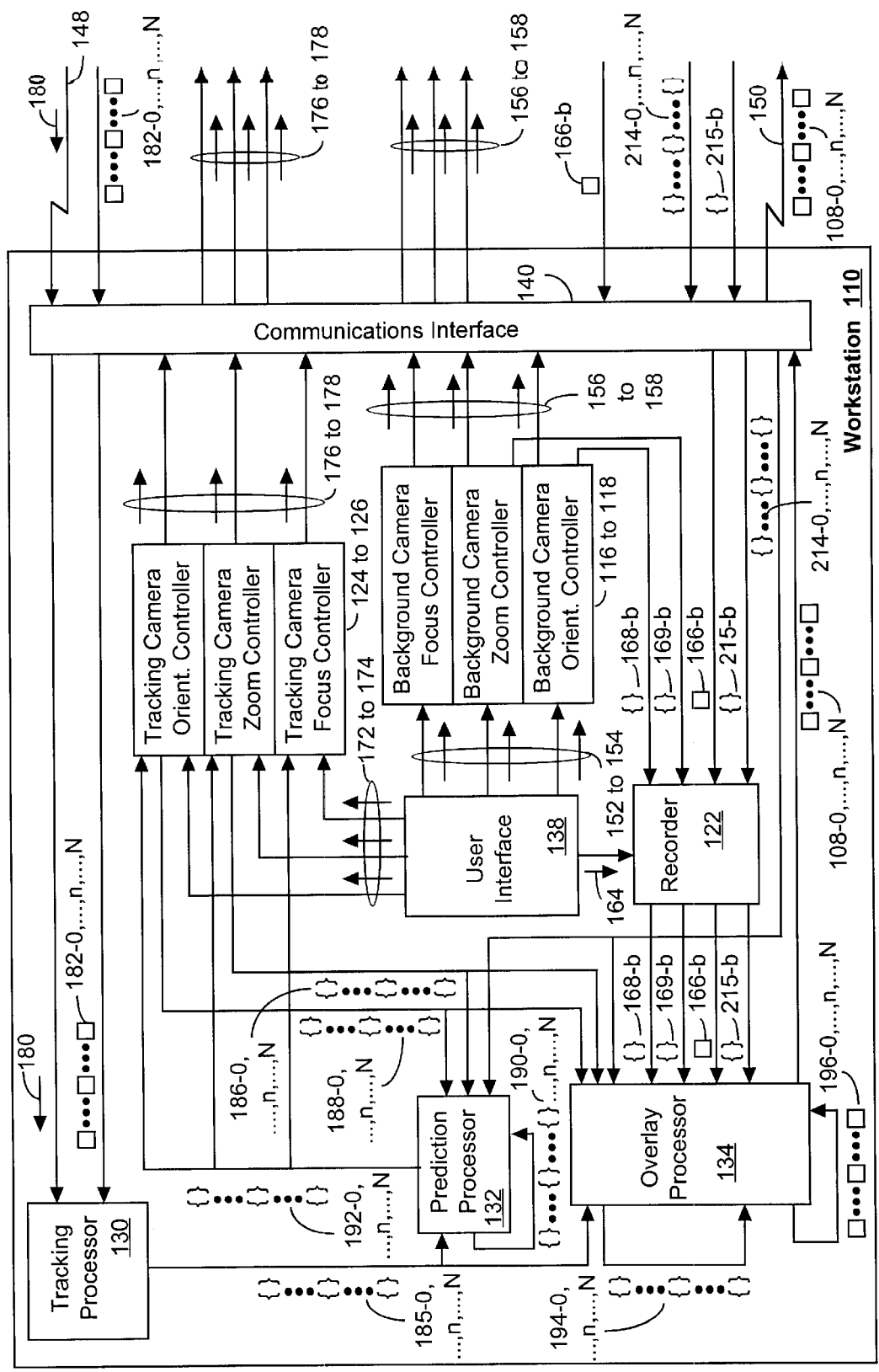
FIG. 4 is a functional block diagram showing the operation of the display enhancement system in one embodiment.

FIGS. 4 and 5 show the configuration and operation of the display enhancement system 100 in one embodiment of the invention. In this embodiment, only one background video image frame 166-b is used to generate the successive overlaid video image frames $108\text{-}0, \ldots, n, \ldots, N$.

Referring now to FIG. 4, in this embodiment, the operation of the display enhancement system 100 begins when the operator of the display enhancement system issues background camera orientation (i.e., direction), zoom, and focus commands 152 to 154 with the user interface 138 at a processing epoch b prior to a golf shot. As shown in FIG. 1, this is done in order to adjust the orientation, zoom, and focus of the background video camera 142 so that the background video camera will be oriented (i.e., directed) toward the golf hole 106, will be zoomed to provide the large field of view 109 containing the golf hole, and will be focused on the golf hole.

Turning back to FIG. 4, the background camera orientation, zoom, and focus commands 152 to 154 issued by the operator of the display enhancement system 100 are respectively received by the background camera orientation, zoom, and focus controllers 116 to 118 which respectively generate in response corresponding background camera orientation, zoom, and focus control signals 156 to 158. The background camera orientation, zoom, and focus control signals are provided to the background video camera 142 via the communications interface 140. In response to these control signals, the background video camera 142 adjusts its orientation, zoom, and focus accordingly so that it is oriented, zoomed, and focused in the manner just described.

The operator of the display enhancement system 100 then issues a record command 164 with the user interface 138 to record the current background video image frame 166-b being provided by the background video camera 142, the current background camera orientation and zoom data sets 168-b and 169-b being provided by the background camera orientation and zoom controllers 116 and 117, and the current background camera position data set 215-b. Referring to FIGS. 1 and 5, because the background video camera is oriented, zoomed, and focused in the manner just described, the background video image frame represents an overhead background video image $B_b$ of the large field of view 109 containing the golf hole 106 at the current processing epoch b at which the background video image frame was generated. Moreover, the current background camera orientation and zoom data sets represent the current orientation $o_{Bb}$ and the degree of zoom $z_{Bb}$ of the background video camera at the current processing epoch. Finally, the current background camera position data set represents the precise position of the background video camera with respect to the golf hole at the current processing epoch.

Referring back to FIG. 4, the current background video image frame 166 is received by the recorder 122 via the communications interface 140. In response to the record command 164, the recorder records (i.e., stores) the current background video image frame 166-b, the current background camera orientation and zoom data sets 168-b and 169-b, and the current background camera position data set 215-b. This is done in the memory 112 shown in FIG. 2 in a corresponding storage space of the recorder.

Looking again at FIG. 4, as with the background video camera 142, the operator of the display enhancement system 100 issues tracking camera orientation, zoom, and focus commands 172 to 174 prior to the golf shot with the user interface 138 to adjust the orientation, zoom, and focus of the tracking video camera 144. As shown in FIG. 1, this is done so that, prior to the golf shot, the tracking video camera is oriented toward the golf ball 104 at the tee of the golf hole, is zoomed to provide an initial small field of view 184-0 containing the golf ball, and is focused on the golf ball. As a result, the tracking video camera will be initialized to track the golf ball.

As shown in FIG. 4, the tracking camera orientation, zoom, and focus commands 172 to 174 are respectively received by the tracking camera orientation, zoom, and focus controllers 124 to 126 which respectively generate in response corresponding tracking camera orientation, zoom, and focus control signals 176 to 178. The tracking camera orientation, zoom, and focus control signals are provided to the tracking video camera 144 via the communications interface 140. In response to these control signals, the tracking video camera adjusts its orientation, zoom, and focus accordingly so that, prior to the golf shot, the tracking video camera is oriented, zoomed, and focused in the manner just described.

Referring back to FIG. 1, the sensor 146 is located near the tee of the golf hole 106. When it senses that the golf ball 104 has been struck by a golfer, it generates a sensor signal 180 indicating that this has occurred. This sensor may be an acoustic or optical sensor, as those skilled in the art will recognize.

As shown in FIG. 4, the sensor signal 180 is received by the tracking processor 130 via the communications link 148 and the communications interface 140. The communications link may comprise a radio transmission system, a fiber optic cable, and/or other communications devices or elements well known to those skilled in the art. In response to the sensor signal, the tracking processor begins processing successive tracking video image frames 182-0, ..., n, ..., N generated at the successive processing epochs 0, ..., n, ..., N by the tracking video camera 144 in order to track the golf ball 104. Referring to FIG. 5, the successive tracking video image frames 182-0, ..., n, ..., N represent corresponding successive tracking video images $T_0$, ..., $T_n$, ..., $T_N$ of successive small field of views 184-0, ..., n, ..., N containing the golf ball at the corresponding successive processing epochs. Thus, each successive tracking video image frame 182-n represents the corresponding tracking video image $T_n$ of the corresponding small field of view 184-n containing the golf ball at the corresponding processing epoch n.

The successive tracking video image frames 182-0, ..., n, ..., N are received by the tracking processor 130 via the communications interface 140, as shown in FIG. 4. From the successive tracking video image frames, the tracking processor generates at the successive processing epochs 0, ..., n, ..., N successive determined location data sets 185-0, ..., n, ..., N. Turning to FIG. 5, the successive determined position data sets represent corresponding successive determined locations $(x,y)_{GB,T0}, ..., (x,y)_{GB,Tn}, ..., (x,y)_{GB,TN}$ of the golf ball 104 at the corresponding successive processing epochs in the tracking video images $T_0, ..., T_n, ..., T_N$.

Referring now to both FIGS. 4 and 5, the successive determined location data sets 185-0, ..., n, ... N are generated in a manner similar to that described in the earlier referenced U.S. Pat. No. 5,342,051 and with known video image frame processing techniques. More specifically, each successive determined location data set 185-n is generated at the corresponding processing epoch n from the corresponding tracking video image frame 182-n at the epoch and represents the corresponding determined location $(x,y)_{GB,Tn}$ of the golf ball in the corresponding tracking video image $T_n$. And, at each successive processing epoch, the corresponding determined location of the golf ball in the corresponding tracking video image is determined by locating its center and computing its area.

As shown in FIG. 4, at the successive processing epochs 0, ..., n, ..., N, the tracking camera orientation and zoom controllers 124 and 125 respectively generate successive tracking camera orientation and zoom data sets 186-0, ..., n, ..., N and 188-0, ..., n, ..., N. Looking at both FIGS. 1 and 4, the successive tracking camera orientation and zoom data sets respectively represent the corresponding successive orientations $o_{T0}, ..., o_{Tn}, ..., o_{TN}$ and degrees of zoom $z_{T0}, ..., z_{Tn}, ..., z_{TN}$ of the tracking video camera 144 at the corresponding successive processing epochs 0, ..., n, ... N. Therefore, each successive tracking camera orientation data set 186-n and each successive tracking camera zoom data set 188-n respectively represent the corresponding orientation $o_{Tn}$ and degree of zoom $z_{Tn}$ of the tracking video camera at the corresponding processing epoch n.

As shown in FIG. 4, from the successive determined location data sets 185-0, ..., n, ..., N, the successive tracking camera orientation and zoom data sets 186-0, ..., n, ..., N and 188-0, ..., n, ..., N, and the successive tracking camera position data sets 214-0, ..., n, ..., N received via the communications interface 140, the path prediction processor 132 generates successive determined position data sets 190-0, ..., n, ..., N at the successive processing epochs 0, ..., n, ..., N. Turning to FIG. 1, the successive determined position data sets represent the successive determined positions of the golf ball in the path 102 at the successive processing epochs with respect to the tracking video camera 144.

Referring to FIGS. 1, 4, and 5, the successive determined position data sets 190-0, ..., n, ..., N are generated in a similar manner to that described in the earlier referenced U.S. Pat. No. 5,342,051. Specifically, each successive determined position data set 190-n is generated at the corresponding processing epoch n from the corresponding determined location data set 185-n and the corresponding tracking camera orientation and zoom data sets 186-n and 188-n. Thus, each successive determined position data set represents the corresponding determined position of the golf ball 104 in the path 102 at the corresponding processing epoch with respect to the tracking video camera 144. And, each successive determined position is computed at the corresponding processing epoch from (1) the corresponding determined location $(x,y)_{GB,Tn}$ of the golf ball in the corresponding tracking video image $T_n$ at the epoch, and (2) the corresponding orientation $o_{Tn}$ and degree of zoom $z_{Tn}$ of the tracking video camera 144 at the epoch.

As shown in FIG. 4, from the successive determined position data sets 190-0, ..., n, ..., N and the successive tracking camera position data sets 214-0, ..., n, ..., N received via the communications interface 140, the path prediction processor 132 generates successive predicted position data sets 192-0, ..., n, ..., N at the successive epochs 0, ..., n, ..., N. Referring to FIG. 1, the successive predicted position data sets represent the corresponding successive predicted positions of the golf ball 104 in the path 102 at the next successive processing epochs with respect to the tracking video camera 144.

Referring now to both FIGS. 1 and 4, the successive predicted position data sets 192-0, ..., n, ..., N are generated in a manner similar to that described in the earlier referenced U.S. Pat. No. 5,342,051. Thus, at each successive processing epoch n, the acceleration and velocity of the golf ball at the epoch are computed from the corresponding determined position data set 190-n generated at the epoch and one or more of the previous successive determined position data sets 190-0, ..., n, ..., N generated at the previous successive processing epochs 0, ..., n, ..., N. At each successive processing epoch n, horizontal and vertical prediction functions are used to predict the position of the golf ball 104 in the path 102 at the next successive processing epoch n+1 based on the acceleration and velocity computed at the epoch. Each successive predicted position data set 192-n at the corresponding processing epoch n represents the corresponding predicted position of the golf ball at the next processing epoch n+1 with respect to the tracking video camera 144.

From the successive predicted position data sets 192-0, ..., n, ..., N, the tracking camera orientation, zoom, and focus controllers 124 to 126 respectively generate the orientation, zoom, and focus control signals 176 to 178. This is done to adjust the orientation, zoom, and focus of the tracking video camera 144 so that, as shown in FIG. 1, it tracks the golf ball 104 over the successive processing epochs 0, ..., n, ..., N.

As mentioned earlier, the tracking camera orientation, zoom, and focus control signals 176 to 178 are provided to the tracking video camera 144 via the communications interface 140. In response to the orientation control signal 176, the tracking video camera 144 continuously adjusts its orientation toward the successive predicted positions of the golf ball 104 represented by the predicted position data sets 192-0, ..., n, ..., N. In response, to the zoom control signal 177, the tracking video camera continuously adjusts its zoom so that the golf ball contained in the successive initial small field of views 184-0, ..., n, ..., N has a constant image size. And, in response to the focus control signal 178, the tracking video camera continuously adjusts its focus to maintain focus on the golf ball. This is done in a manner similar to that described in the earlier referenced U.S. Pat. No. 5,342,051 so that the tracking video camera tracks the golf ball and generates the successive tracking video image frames 182-0, ..., n, ..., N discussed earlier.

In addition to being used for tracking the golf ball 104, the successive determined location data sets 185-0, ..., n, ..., N, the successive tracking camera orientation and zoom data sets 186-0, ..., n, ..., N and 188-0, ..., n, ..., N, and the successive tracking camera position data sets 214-0, ..., n, ..., N are also used by the overlay processor 134 to generate, at the successive processing epochs 0, ..., n, ..., N, successive estimated location data sets 194-0, ..., n, ..., N. This is done also using the recorded background camera orientation and zoom data sets 168-b and 169-b and the recorded background camera position data set 215-b. The successive estimated location data sets represent corresponding successive estimated locations $(x,y)_{GB,Bb,0}, \ldots, (x,y)_{GB,Bb,n}, \ldots, (x,y)_{GB,Bb,N}$ of the golf ball 104 at the corresponding successive processing epochs, from overhead within the large field of view 109, and as they would be in the background video image $B_b$.

Specifically, each successive estimated location data set 194-n is generated at the corresponding processing epoch n from the corresponding determined location data set 185-n, the corresponding tracking camera orientation and zoom data sets 186-n and 188-n, the corresponding tracking camera position data set 214-n, the recorded background camera orientation and zoom data sets 168-b and 169-b, and the recorded background camera position data set 215-b. Referring now to FIGS. 1 and 5, each estimated location data set 194-n represents the corresponding estimated location $(x,y)_{GB,Bb,n}$ of the golf ball 104 at the corresponding processing epoch n, from overhead within the large field of view 109, and as it would be in the background video image $B_b$. And, each successive estimated location $(x,y)_{GB,Bb,n}$ at the corresponding processing epoch n is computed from (1) the corresponding determined location $(x,y)_{GB,Tn}$ of the golf ball in the corresponding tracking video image $T_n$ at the epoch, (2) the corresponding orientation $o_{Tn}$ and degree of zoom $z_{Tn}$ of the tracking video camera 144 at the epoch, (3) the corresponding precise position $(x,y,z)_{TC,n}$ of the tracking camera at the epoch, (4) the orientation $o_{Bb}$ and degree of zoom $z_{Bb}$ of the background video camera 142 at the processing epoch b when the background video image frame 166 was generated and recorded, and (5) the precise position $(x,y,z)_{BC,b}$ of the background camera at the epoch b.

As shown in FIG. 4, from the successive estimated location data sets 194-0, ..., n, ..., N, the overlay processor 134 generates at the Successive processing epochs 0, ..., n, ..., N successive overlay video image frames 196-0, ..., n, ..., N. Referring to FIGS. 1 and 5, the successive overlay video image frames represent corresponding successive overlay video images $Oy_0, \ldots Oy_n, \ldots Oy_N$ of the path 102 of the golf ball 104, at the corresponding successive Processing epochs, from overhead within the large field of view 109, but without the golf hole 106 in the background.

Turning again to FIG. 4, each successive overlay video image frame 196-n is generated at the corresponding processing epoch n from the corresponding estimated location data set 194-n and the previous successive estimated location data sets 194-0, ..., n−1. And, referring to FIGS. 1 and 5, each successive overlay video image frame represents the corresponding overlay video image $Oy_n$ of the path 102 of the golf ball 104, at the corresponding Processing epoch n, from overhead within the large field of view 109, but without the golf hole 106 in the background. In doing so, the path of the golf ball is estimated by fitting a comma shaped curve to the corresponding estimated location $(x,y)_{GB,Bb,n}$ and the previous estimated successive locations $(x,y)_{GB,Bb,0}, \ldots, (x,y)_{GB,Bb,n-1}$ using well known numerical processing techniques. In this way, the comma shaped curve represents the path of the golf ball.

Referring once again to FIG. 4, at the successive Processing epochs 0, ..., n, ..., N, the overlay processor 134 combines the corresponding successive overlay video image frames 196-0, ..., n, ..., N with the corresponding background video image frame 166 to generate the corresponding successive overlaid video image frames 108-0, ..., n, ..., N mentioned earlier. This is done using known video frame processing techniques so that, as shown in FIG. 5, the corresponding successive overlaid video images $Od_0, \ldots, Od_n, \ldots, Od_N$ represented by the overlaid video image frames comprise the corresponding successive overlay video images $Oy_0, \ldots, Oy_n, \ldots, Oy_N$ represented by the overlay video image frames overlaid on the background video image $B_b$ represented by the background video image frame.

Looking at FIG. 4 again, each successive overlaid video image frame 108-n is generated at the corresponding processing epoch n by combining the corresponding overlay video image frame 196-n at the epoch with the background video image frame 166. Referring now to FIGS. 1 and 5, each successive overlaid video image frame 108-n represents the corresponding overlaid video image $Od_n$ of the path 102 of the golf ball 104 at the corresponding processing epoch and from overhead within the large field of view 109 containing the golf hole 106. Moreover, the successive overlaid video image frames are generated in near-real time since each successive overlaid video image frame is generated at the corresponding processing epoch.

Turning again to FIG. 4, the successive overlaid video image frames 108-0, ..., n, ..., N are provided at the corresponding successive processing epochs 0, ..., n, ..., N to the broadcast unit 149 of FIG. 1 via the communications link 150 with each successive overlaid video image frame 108-n being provided at the corresponding processing epoch n. As shown in FIG. 1, the broadcast unit is located on the ground. The broadcast unit then broadcasts the successive overlaid video image frames for display on the television sets of viewers of the sporting event. This may be done so that the successive overlaid video image frames are broadcast at the successive processing epochs with each successive overlaid video image frame being broadcast at the corresponding processing epoch. Thus, in this case, the successive overlaid video image frames are broadcast in near-real time for display in near-real time. Alternatively, the successive overlaid video image frames may be recorded by the broadcast unit and then broadcast for display at a later time.

Figure 6:
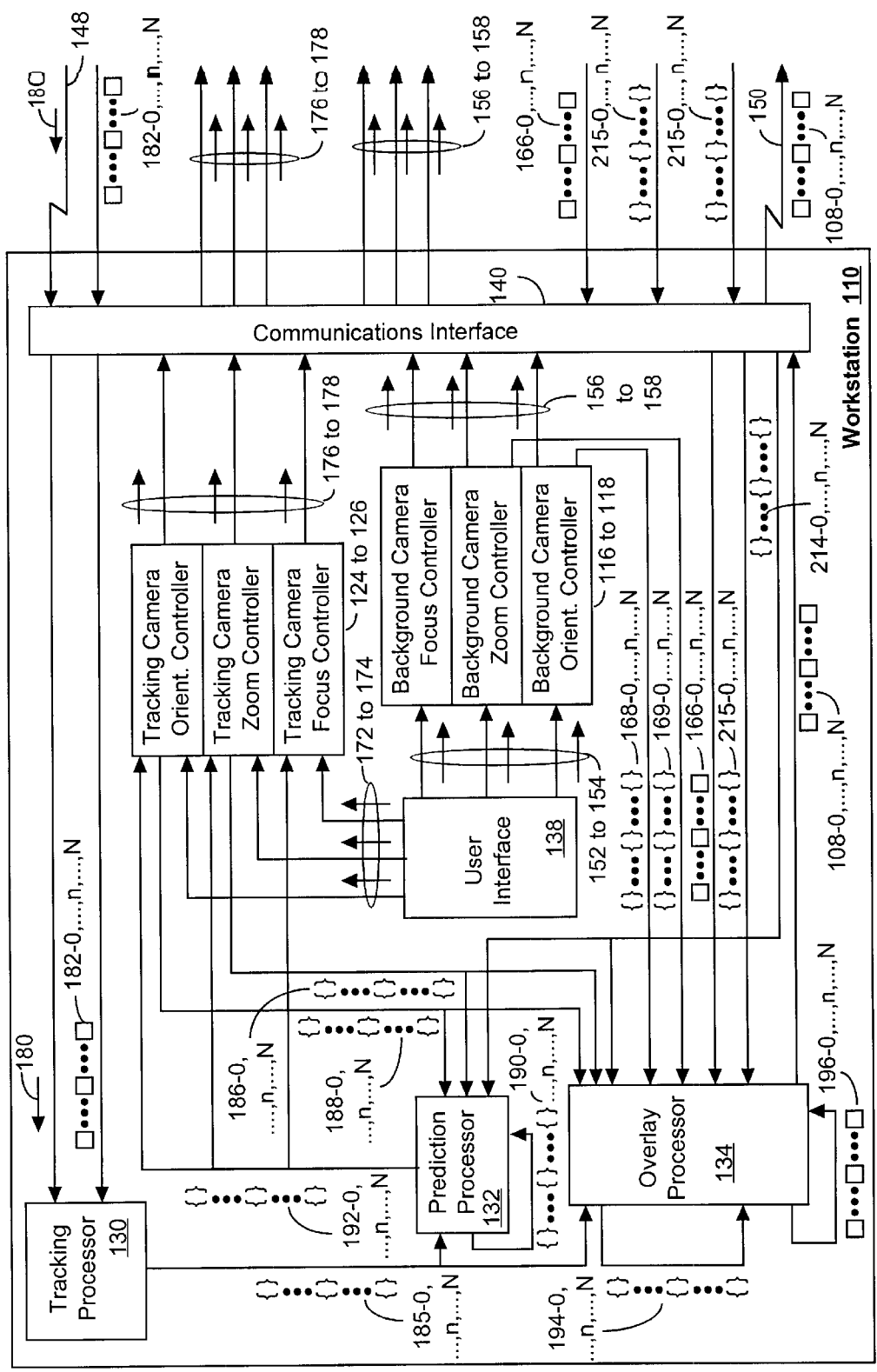
FIG. 6 is a functional block diagram showing the operation of the display enhancement system in another embodiment.

FIGS. 6 and 7 show the configuration and operation of the display enhancement system 100 in another embodiment of the invention. Successive background video image frames 166-0, ..., n, ..., N generated while the ball is moving are used in this embodiment to generate the successive overlaid video image frames 108-0, ..., n, ..., N. This provides a complete real-time display of the golf shot where background moving objects, such as birds, water fountains, flags, etc., in the large field of view 109 of FIG. 1 will also appear to move in real-time as the golf ball 104 is moving.

The configuration and operation of the display enhancement system 100 in this embodiment is similar to that described for the embodiment of FIGS. 4 and 5.

Therefore, only the significant differences between the two embodiments will be discussed next.

Referring to FIGS. 1 and 6, prior to the golf shot, the operator of the display enhancement system 100 causes the background video camera 142 to be oriented toward the golf hole 106, zoomed to provide the large field of view 109 containing the golf hole, and focused on the golf hole. This is done in the same manner as described earlier for the embodiment of FIGS. 4 and 5.

Then, while the golf ball 104 is moving, the successive precise position data sets 215-0, ..., n, ..., N for the background camera are provided to the background camera orientation, zoom, and focus controllers 116 to 118. In response, the background camera orientation, zoom, and focus controllers respectively generate the orientation, zoom, and focus control signals 156 to 158. This is done to adjust the orientation, zoom, and focus of the background video camera so that it is constantly and steadily oriented toward the golf hole 106, zoomed to provide a constant large field of view 109 containing the golf hole, and focused on the golf hole.

As a result, the background video camera 142 generates the successive background video image frames 166-0, ..., n, ..., N at the corresponding successive processing epochs 0, ..., n, ..., N while the ball is moving. Referring to FIGS. 1 and 7, the successive background video image frames represent corresponding successive background video images $B_0, \ldots, B_n, \ldots, B_N$ of the large field of view 109 containing the golf hole 106 at the corresponding successive processing epochs. Thus, each successive background video image frame 166-n represents the corresponding background video image $B_n$ of the large field of view at the corresponding processing epoch n.

Moreover, at the successive processing epochs 0, ..., n, ..., N, the background camera orientation and zoom controllers 116 and 117 respectively generate successive background camera orientation and zoom data sets 186-0, ..., n, ..., N and 188-0, ..., n, ..., N. Referring to both FIGS. 1 and 7, the successive background camera orientation and zoom data sets respectively represent the corresponding successive orientations $o_{T0}, \ldots, o_{Tn}, \ldots, o_{TN}$ and degrees of zoom $z_{T0}, \ldots, z_{Tn}, \ldots, z_{TN}$ of the background video camera 142 at the corresponding successive processing epochs.

Therefore, each successive background camera orientation data set 168-n and each successive background camera zoom data set 169-n respectively represent the corresponding orientation $o_{Bn}$ and degree of zoom $z_{Bn}$ of the background video camera at the corresponding processing epoch n.

Similar to the embodiment of FIGS. 4 and 5, the overlay processor 134 of FIG. 6 generates corresponding successive estimated location data sets 195-0, ..., n, ..., N at the successive processing epochs 0, ..., n, ..., N. This is done using the corresponding successive determined location data sets 185-0, ..., n, ..., N, the corresponding successive tracking camera orientation and zoom data sets 186-0, ..., n, ..., N and 188-0, ..., n, ..., N, the corresponding successive tracking camera position data sets 214-0, ..., n, ..., N, the corresponding successive background camera orientation and zoom data sets 168-0, ..., n, ..., N and 169-0, ..., n, ..., N, and the corresponding successive background camera position data sets 215-0, ..., n, ..., N at the successive processing epochs.

Each successive estimated location data set 195-n is generated at the corresponding current processing epoch n from the current and previous determined location data sets 185-0, ..., n, the current and previous tracking camera orientation and zoom data sets 186-0, ..., n and 188-0, ..., n, the current and previous tracking camera position data sets 214-0, ..., n, the current and previous background camera orientation and zoom data sets 168-0, ..., n and 169-0, ..., n, and the current and previous background camera position data sets 215-0, ..., n. And, referring to FIGS. 1 and 7, each estimated location data set 195-n represents successive estimated locations $(x,y)_{GB,Bn,0}, \ldots, (x,y)_{GB,Bn,n}$ of the golf ball 104 at the successive processing epochs 0, ..., n, from overhead within the large field of view 109, and as they would be in the current background video image $B_n$.

The current estimated location $(x,y)_{GB,B,n}$ of the golf ball 104 at the current processing epoch n in the current background video image $B_n$ is computed from (1) the corresponding determined location $(x,y)_{GB,Tn}$ of the golf ball in the corresponding tracking video image $T_n$ at the epoch, (2) the corresponding orientation $o_{Tn}$ and degree of zoom $z_{Tn}$ of the tracking video camera 144 at the epoch, (3) the corresponding precise position $(x,y,z)_{TC,n}$ of the tracking camera at the epoch, (4) the corresponding orientation $o_{Bn}$ and degree of zoom $z_{Bn}$ of the background video camera 142 at the epoch, and (5) the corresponding precise position $(x,y,z)_{BC,n}$ of the background camera at the epoch. Thus, the current estimated location of the golf ball is computed in the same manner as that in the embodiment of FIGS. 4 and 5.

Since the tracking and background cameras 142 and 144 are on a moving blimp 152, their positions $(x,y,z)_{TC,n}$ and $(x,y,z)_{BC,n}$ at the current processing epoch n may have changed from those $(x,y,z)_{TC,0}, \ldots, (x,y,z)_{TC,n-1}$ and $(x,y,z)_{BC,0}, \ldots, (x,y,z)_{BC,n-1}$ at the previous epochs 0, ..., n−1. This means that the current background video image $B_n$ may be different from the previous background video images $B_0, \ldots, B_{n-1}$. As a result, the previous estimated locations $(x,y)_{GB,Bn,0}, \ldots, (x,y)_{GB,Bn,n-1}$ of the golf ball 104 at the previous processing epochs must be computed for the proper location in the current background video image $B_n$. Each previous estimated location $(x,y)_{GB,Bn,i}$ at the corresponding previous processing epoch i, where $0 \leq i \leq n-1$, is computed from (1) the corresponding determined location $(x,y)_{GB,Ti}$ of the golf ball in the corresponding tracking video image $T_i$ at the previous processing epoch, (2) the corresponding orientation $o_{Ti}$ and degree of zoom $z_{Ti}$ of the tracking video camera at the previous processing epoch, (3) the corresponding precise position $(x,y,z)_{TC,i}$ of the tracking camera at the previous processing epoch, (4) the corresponding orientation $o_{Bi}$ and degree of zoom $z_{Bi}$ of the background video camera at the previous processing epoch, (5) the corresponding precise position $(x,y,z)_{BC,i}$ of the background camera at the previous processing epoch, (6) the corresponding orientation $o_{Tn}$ and degree of zoom $x_{Tn}$ of the tracking video camera at the current processing epoch, (7) the corresponding precise position $(x,y,z)_{TC,n}$ of the tracking camera at the current processing epoch, (8) the corresponding orientation $o_{Bn}$ and degree of zoom $z_{Bn}$ of the background video camera at the current processing epoch, and (9) the corresponding precise position $(x,y,Z)_{BC,n}$ of the background camera at the current processing epoch.

Referring to FIG. 6, from the successive estimated location data sets 195-0, ..., n, ..., N, the overlay processor 134 generates at the corresponding successive processing epochs 0, ..., n, ..., N the corresponding successive overlay video image frames 196-0, ..., n, ..., N. This is done in a similar manner to that described earlier for the embodiment of FIGS. 4 and 5. However, each successive overlay video image frame 196-n is generated at the corresponding processing epoch n from the corresponding estimated location data set 195-n. In doing so, the path of the golf ball is estimated by fitting a comma shaped curve, as shown in FIG. 7, to the successive estimated locations $(x,y)_{GB,Bn,0}, \ldots, (x,y)_{GB,Bn,n}$ represented by the estimated location data set using well known numerical processing techniques.

Referring back to FIG. 6, at the successive processing epochs 0, ..., n, ..., N, the overlay processor 134 combines the corresponding successive overlay video image frames 196-0, ..., n, ..., N with the corresponding successive background video image frames 166-0, ..., n, ..., N to generate the corresponding successive overlaid video image frames 108-0, ..., n, ..., N mentioned earlier. This is done using known video frame processing techniques so that, as shown in FIG. 7, the successive overlaid video images $Od_0, \ldots, Od_n, \ldots, Od_N$ represented by the corresponding overlaid video image frames comprise the successive overlay video images $Oy_0, \ldots, Oy_n, \ldots, Oy_N$ represented by the corresponding overlay video image frames overlaid on the successive background video images $B_0, \ldots, B_n, \ldots, B_N$ represented by the corresponding background video image frames.

Referring again to FIG. 6 again, each successive overlaid video image frame 108-n is generated at the corresponding processing epoch n by combining the corresponding overlay video image frame 196-n at the epoch with the corresponding background video image frame 166-n. Referring now to both FIGS. 1 and 7, each successive overlaid video image frame 108-n represents the corresponding overlaid video image $Od_n$ of the path 102 of the golf ball 104 at the corresponding processing epoch and from overhead within the large field of view 109 containing the golf hole 106. Moreover, the successive overlaid video image frames are generated in near-real time since each successive overlaid video image frame and background video image frame is generated at the corresponding processing epoch.

The tracking and background video cameras 142 and 144 shown in FIG. 1 were described as being moveably mounted on a blimp 152. However, those skilled in the art will recognize that these cameras could also be moveably mounted on another moving object, such as another type of aircraft, or a stationary object, such as a support structure, located over the golf hole 106. Moreover, a single video camera could be used to perform the operations of both the tracking and background video cameras.

Furthermore, the workstation 110 was described as being located on the blimp 152. However, those skilled in the art will recognize that the display enhancement system 100 could have a camera control workstation located in the blimp and close to the background and tracking video cameras 142 and 144 and a video frame processing workstation located on the ground. In this case, both the camera control and video frame processing workstations would include a memory 112, the CPU 136, the user interface 138, the communications interface 140, and the operating system 114. However, the camera control workstation would include the master and tracking camera orientation, zoom, and focus controllers 116,118,120, 124, 126, and 128, the tracking processor 130, and the path prediction processor 132. The video frame processing workstation would include the recorder 122 and the overlay processor 134. In this case, the communications link 150 would be used to provide the successive estimated location data sets 185-0, ..., n, ..., N, the successive tracking and background camera orientation and zoom data sets 186-0, ..., n, ..., N, 188-0, ..., n, ..., N, 168-b, ..., 0, ..., n, ..., N, and 169-b, ..., 0, ..., n, ..., N, the tracking and background camera position data sets 214-b, ..., 0, ..., n, ..., N and 215-b, ..., 0, ..., n, ..., N, and the background video image frames 166-b, ..., 0, ..., n, ..., N to the video frame processing workstation.

As another alternative embodiment, the master and tracking camera orientation, zoom, and focus controllers 116, 118, 120, 124, 126, and 128, the recorder 122, the tracking processor 130, the path prediction processor 132, and the overlay processor 134 could all be discrete units. In this case, each of these units would include a programmed microprocessor or digital signal processor (DSP) for performing the corresponding operations described earlier.

Furthermore, as described earlier, a GPS positioning system 200 is used to provide centimeter level accuracy for determining the positions of the tracking and background video cameras 142 and 144. However, other types of precise positioning systems that provide this type of accuracy may also be used. For example, a positioning system that only uses ground based transmitters or pseudolites could be used. Or, a positioning system that uses other types of satellites with or without ground based transmitters or pseudolites could also be used.

Finally, while the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A system for enhancing display of a sporting event by tracking the path of a ball in a playing field of the sporting event while the ball is moving and generating successive overlaid video image frames that represent successive overlaid video images of the path of the ball in the playing field within an overhead large field of view over the playing field, the system comprising:

a tracking video camera that is positioned over the playing field and generates successive tracking video image frames while the ball is moving that represent successive tracking video images of successive overhead small fields of view that contain the ball and are within the overhead large field of view;

a tracking processor that generates from the successive tracking video image frames successive determined location data sets that represent successive determined locations of the ball within the successive tracking video images;

a path prediction processor that generates from the successive determined location data sets successive predicted position data sets that represent successive predicted positions of the ball with respect to the tracking video camera so as to predict the path of the ball;

tracking camera orientation, zoom, and focus controllers that generate tracking camera orientation, zoom, and focus control signals from the successive predicted position data sets;

the tracking video camera adjusting its orientation, zoom, and focus in response to the tracking camera orientation, zoom, and focus control signals so as to be oriented toward, zoomed in on, and focused on the ball in the overhead small fields of view while the ball is moving so that the ball is tracked;

a background video camera that is positioned over the playing field and generates successive background video image frames that represent successive background video images of the playing field within the overhead large field of view while the ball is moving; and an overlay processor that (1) generates from the successive determined location data sets successive overlay video image frames that represent successive overlay video images of the path of the ball within the overhead large field of view but without the playing field in the background, and (2) combines the successive overlay video image frames with the successive background video image frames to generate the successive overlaid video image frames such that the successive overlaid video images comprise the successive overlay video images overlaid on the successive background video images.

2. The system of claim 1 wherein the overlay processor (1) generates the successive overlay video image frames in near real time, and (2) combines the successive overlay video image frames with the successive background video image frames in near real time to generate the successive overlaid video image frames in near real time.

3. The system of claim 2 further comprising a broadcast unit that broadcasts the successive overlaid video image frames in near real time for display in near-real time.

4. The system of claim 1 further comprising:

background camera orientation, zoom, and focus controllers that generate background camera orientation, zoom, and focus control signals and successive background camera orientation and zoom data sets representing the orientation and degree of zoom of the background video camera when the successive background video image frames are generated;

the background video camera adjusting its orientation, zoom, and focus in response to the background camera orientation, zoom, and focus control signals so as to be oriented toward, zoomed in on, and focused on the playing field in the large field of view;

the tracking camera orientation and zoom controllers also generating from the successive predicted position data sets successive tracking camera orientation and zoom data sets representing the successive orientations and degrees of zoom of the tracking video camera when the successive tracking video image frames are generated; and the overlay processor generates the successive overlay video image frames also from the successive tracking camera orientation and zoom data sets and the successive background camera orientation and zoom data sets.

5. The system of claim 4 wherein:

the tracking and background video cameras are mounted on a moving object that positions the tracking and background video cameras over the playing field;

the system further comprises a precise positioning system that generates successive precise tracking camera position data sets and successive precise background camera position data sets, the successive precise tracking camera position data sets representing successive precise positions of the tracking video camera with respect to the playing field when the successive tracking video image frames are generated, the successive precise background camera position data sets representing successive precise positions of the background video camera with respect to the playing field when the successive background video image frames are generated;

the path prediction processor generates the successive predicted position data sets also from the successive precise tracking camera position data sets; and the overlay processor generates the successive overlay video image frames also from the successive precise tracking camera and background camera position data sets.

6. The system of claim 1 wherein the overlay processor generates the successive overlay and overlaid video images such that the path of the ball in the successive overlay and overlaid video images is represented by a comma shaped curve.

7. A method for enhancing display of a sporting event by tracking the path of a ball in a playing field of the sporting event while the ball is moving and generating successive overlaid video image frames that represent successive overlaid video images of the path of the ball in the playing field within an overhead large field of view over the playing field, the method comprising:

positioning a tracking video camera and background video camera over the playing field;

with the tracking video camera, generating successive tracking video image frames while the ball is moving that represent successive tracking video images of successive overhead small fields of view that contain the ball and are within the overhead large field of view;

generating from the successive tracking video image frames successive determined location data sets that represent successive determined locations of the ball within the successive tracking video images;

generating from the successive determined location data sets successive predicted position data sets that represent successive predicted positions of the ball with respect to the tracking video camera so as to predict the path of the ball;

generating tracking camera orientation, zoom, and focus control signals from the successive predicted position data sets;

adjusting the tracking video camera's orientation, zoom, and focus in response to the tracking camera orientation, zoom, and focus control signals so that the tracking video camera is oriented toward, zoomed in on, and focused on the ball in the overhead small fields of view while the ball is moving so that the ball is tracked;

with the background video camera, generating successive background video image frames that represent successive background video images of the playing field within the overhead large field of view;

generating from the successive determined location data sets successive overlay video image frames that represent successive overlay video images of the path of the ball within the overhead large field of view but without the playing field in the background; and combining the successive overlay video image frames with the successive background video image frames to generate the successive overlaid video image frames such that the successive overlaid video images comprise the successive overlay video images overlaid on the successive background video images.

8. The method of claim 7 wherein:

the successive overlay video image frames are generated in the overlay video image frames generating step in near real time; and the successive overlay video image frames are combined in the combining step with the successive background video image frames in near real time to generate the successive overlaid video image frames in near real time.

9. The method of claim 8 further comprising the step of broadcasting the successive overlaid video image frames in near real time for display in near-real time.

10. The method of claim 7 further comprising the steps of:

generating background camera orientation, zoom, and focus control signals and background camera orientation and zoom data sets representing the orientation and degree of zoom of the background video camera when the successive background video image frames are generated;

adjusting the background video camera's orientation, zoom, and focus in response to the background camera orientation, zoom, and focus control signals so that the background video camera is oriented toward, zoomed in on, and focused on the playing field in the large field of view;

generating from the successive predicted position data sets successive tracking camera orientation and zoom data sets representing the successive orientations and degrees of zoom of the tracking video camera when the successive tracking video image frames are generated;

the successive overlay video image frames being generated in the overlay video image frames generating step also from the successive tracking camera orientation and zoom data sets and the successive background camera orientation and zoom data sets.

11. The method of claim 10 wherein:

the tracking and background video cameras are positioned over the playing field in the positioning step with a moving object on which the tracking and background video cameras are mounted;

the method further comprising the steps of:

generating successive precise tracking camera position data sets that represent successive precise positions of the tracking video camera with respect to the playing field when the successive tracking video image frames are generated;

generating successive precise background camera position data sets that represent successive precise positions of the background video camera with respect to the playing field when the successive background video image frames are generated;

the successive predicted position data sets are generated in the successive predicted position data sets generating step also from the successive precise tracking camera position data sets; and the successive overlay video image frames are generated in the successive overlay video image frames generating step also from the successive precise tracking camera and background camera position data sets.

12. The method of claim 7 wherein the successive overlay and overlaid video images are generated in the overlay video image frames generating and combining steps such that the path of the ball in the successive overlay and overlaid video images is represented by a comma shaped curve.

13. A system for enhancing display of a sporting event by tracking the path of a ball in a playing field of the sporting event while the ball is moving and generating successive overlaid video image frames that represent successive overlaid video images of the path of the ball in the playing field within an overhead large field of view over the playing field, the system comprising:

a tracking video camera that is mounted on a moving object, positioned over the playing field with the moving object, and generates successive tracking video image frames while the ball is moving, the successive tracking video image frames representing successive tracking video images of successive overhead small fields of view that contain the ball and are within the overhead large field of view;

a background video camera that is mounted on a moving object, positioned over the playing field with the moving object, and generates a background video image frame, the background video image frame representing a background video image of the playing field within the overhead large field of view;

a precise positioning system that generates successive precise tracking camera position data sets and a precise background camera position data set that respectively represent successive precise positions of the tracking video camera with respect to the playing field when the successive tracking video image frames are generated and a precise position of the background video camera with respect to the playing field when the background video image frame was generated;

a tracking processor that generates from the successive tracking video image frames successive determined location data sets that represent successive determined locations of the ball within the successive tracking video images;

a path prediction processor that generates from the successive determined location data sets and the successive precise tracking camera position data sets successive predicted position data sets that represent successive predicted positions of the ball with respect to the tracking video camera so as to predict the path of the ball;

tracking camera orientation, zoom, and focus controllers that generate tracking camera orientation, zoom, and focus control signals from the successive predicted position data sets;

the tracking video camera adjusting its orientation, zoom, and focus in response to the tracking camera orientation, zoom, and focus control signals so as to be oriented toward, zoomed in on, and focused on the ball in the overhead small fields of view while the ball is moving so that the ball is tracked; and an overlay processor that (1) generates from the successive determined location data sets and the successive precise tracking camera and background camera position data sets successive overlay video image frames that represent successive overlay video images of the path of the ball within the overhead large field of view but without the playing field in the background, and (2) combines the successive overlay video image frames with the background video image frame to generate the successive overlaid video image frames such that the successive overlaid video images comprise the successive overlay video images overlaid on the background video image.

14. The system of claim 13 wherein the overlay processor (1) generates the successive overlay video image frames in near real time, and (2) combines the successive overlay video image frames with the background video image frame in near real time to generate the successive overlaid video image frames in near real time.

15. The system of claim 14 further comprising a broadcast unit that broadcasts the successive overlaid video image frames in near real time for display in near-real time.

16. The system of claim 13 further comprising:

background camera orientation, zoom, and focus controllers that generate background camera orientation, zoom, and focus control signals and background camera orientation and zoom data sets representing the orientation and degree of zoom of the background video camera when the background video image frame is generated;

the background video camera adjusting its orientation, zoom, and focus in response to the background camera orientation, zoom, and focus control signals so as to be oriented toward, zoomed in on, and focused on the playing field in the large field of view;

the tracking camera orientation and zoom controllers also generating from the successive predicted position data sets successive tracking camera orientation and zoom data sets representing the successive orientations and degrees of zoom of the tracking video camera when the successive tracking video image frames are generated; and the overlay processor generates the successive overlay video image frames also from the successive tracking camera orientation and zoom data sets and the background camera orientation and zoom data sets.

17. The system of claim 13 wherein the overlay processor generates the successive overlay and overlaid video images such that the path of the ball in the successive overlay and overlaid video images is represented by a comma shaped curve.

18. A method for enhancing display of a sporting event by tracking the path of a ball in a playing field of the sporting event while the ball is moving and generating successive overlaid video image frames that represent successive overlaid video images of the path of the ball in the playing field within an overhead large field of view over the playing field, the method comprising:

positioning a tracking video camera and a background video camera over the playing field with a moving object on which the tracking and background video cameras are mounted;

with the tracking video camera, generating successive tracking video image frames while the ball is moving that represent successive tracking video images of successive overhead small fields of view that contain the ball and are within the overhead large field of view;

generating successive precise tracking camera position data sets that represent successive precise positions of the tracking video camera with respect to the playing field when the successive tracking video image frames are generated;

generating from the successive tracking video image frames successive determined location data sets that represent successive determined locations of the ball within the successive tracking video images;

generating from the successive determined location data sets and the successive precise tracking camera position data sets successive predicted position data sets that represent successive predicted positions of the ball with respect to the tracking video camera so as to predict the path of the ball;

generating tracking camera orientation, zoom, and focus control signals from the successive predicted position data sets;

adjusting the tracking video camera's orientation, zoom, and focus in response to the tracking camera orientation, zoom, and focus control signals so that the tracking video camera is oriented toward, zoomed in on, and focused on the ball in the overhead small fields of view while the ball is moving so that the ball is tracked;

with the background video camera, generating a background video image frame that represents a background video image of the playing field within the overhead large field of view;

generating a precise background camera position data set that represents a precise position of the background camera with respect to the playing field when the background video image frame is generated;

generating from the successive determined location data sets and the successive precise tracking camera and background camera position data sets successive overlay video image frames that represent successive overlay video images of the path of the ball within the overhead large field of view but without the playing field in the background; and combining the successive overlay video image frames with the background video image frame to generate the successive overlaid video image frames such that the successive overlaid video images comprise the successive overlay video images overlaid on the background video image.

19. The method of claim 18 wherein:

the successive overlay video image frames are generated in the overlay video image frames generating step in near real time; and the successive overlay video image frames are combined in the combining step with the background video image frame in near real time to generate the successive overlaid video image frames in near real time.

20. The method of claim 19 further comprising the step of broadcasting the successive overlaid video image frames in near real time for display in near-real time.

21. The method of claim 18 further comprising the steps of:

generating background camera orientation, zoom, and focus control signals and background camera orientation and zoom data sets representing the orientation and degree of zoom of the background video camera when the background video image frame is generated;

adjusting the background video camera's orientation, zoom, and focus in response to the background camera orientation, zoom, and focus control signals so that the background video camera is oriented toward, zoomed in on, and focused on the playing field in the large field of view;

generating from the successive predicted position data sets successive tracking camera orientation and zoom data sets representing the successive orientations and degrees of zoom of the tracking video camera when the successive tracking video image frames are generated; and the successive overlay video image frames being generated in the overlay video image frames generating step also from the successive tracking camera orientation and zoom data sets and the background camera orientation and zoom data sets.

22. The method of claim 18 wherein the successive overlay and overlaid video images are generated in the overlay video image frames generating and combining steps such that the path of the ball in the successive overlay and overlaid video images is represented by a comma shaped curve.

\* \* \* \* \*